(12) United States Patent
Park et al.

(10) Patent No.: US 12,482,877 B2
(45) Date of Patent: Nov. 25, 2025

(54) BATTERY MODULE AND BATTERY PACK INCLUDING THE SAME

(71) Applicant: LG ENERGY SOLUTION, LTD., Seoul (KR)

(72) Inventors: Won Kyoung Park, Daejeon (KR); Junyeob Seong, Daejeon (KR); Subin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 523 days.

(21) Appl. No.: 17/924,088

(22) PCT Filed: Feb. 17, 2022

(86) PCT No.: PCT/KR2022/002361
§ 371 (c)(1),
(2) Date: Nov. 8, 2022

(87) PCT Pub. No.: WO2022/182063
PCT Pub. Date: Sep. 1, 2022

(65) Prior Publication Data
US 2023/0178821 A1    Jun. 8, 2023

(30) Foreign Application Priority Data

Feb. 26, 2021   (KR) .......................... 10-2021-0026972

(51) Int. Cl.
*H01M 10/653*   (2014.01)
*H01M 10/613*   (2014.01)
(Continued)

(52) U.S. Cl.
CPC ..... *H01M 10/653* (2015.04); *H01M 10/6553* (2015.04); *H01M 10/6554* (2015.04);
(Continued)

(58) Field of Classification Search
CPC ........... H01M 10/653; H01M 10/6553; H01M 10/6554; H01M 10/658; H01M 10/613;
(Continued)

(56) References Cited

U.S. PATENT DOCUMENTS

2018/0194235 A1    7/2018   Kim et al.
2018/0375077 A1   12/2018   Shin et al.
(Continued)

FOREIGN PATENT DOCUMENTS

CN       212230496      12/2020
EP         3731304      10/2020
(Continued)

*Primary Examiner* — Eugenia Wang
(74) *Attorney, Agent, or Firm* — Bryan Cave Leighton Paisner LLP (57) ABSTRACT

A battery module including a battery cell stack in which a plurality of battery cells are stacked, a housing that houses the battery cell stack, a pair of busbar frames that cover a portion of the battery cell stack not covered by the housing, a pair of busbars, each connected to an electrode lead protruding from the battery cell stack via a slot formed in the respective busbar frame, a pair of end plates covering the pair of busbar frames, and at least one heat transfer member that is connected to one of the pair of busbars, where the at least one heat transfer member is in contact with the respective end plate.

10 Claims, 12 Drawing Sheets

(51) Int. Cl.
*H01M 10/6553* (2014.01)
*H01M 10/6554* (2014.01)
*H01M 50/211* (2021.01)
*H01M 50/503* (2021.01)
*H01M 50/507* (2021.01)

(52) U.S. Cl.
CPC ....... *H01M 50/211* (2021.01); *H01M 50/503* (2021.01); *H01M 50/507* (2021.01); *H01M 10/613* (2015.04)

(58) Field of Classification Search
CPC ............. H01M 50/211; H01M 50/503; H01M 50/507; Y02E 60/10
See application file for complete search history.

(56) References Cited

U.S. PATENT DOCUMENTS

| | | | |
|---|---|---|---|
| 2019/0074557 A1 | 3/2019 | Shin et al. | |
| 2019/0074562 A1 | 3/2019 | Kim et al. | |
| 2020/0169069 A1 | 5/2020 | Hiramitsu et al. | |
| 2020/0176739 A1 | 6/2020 | You et al. | |
| 2020/0189400 A1 | 6/2020 | Kim et al. | |
| 2020/0343604 A1* | 10/2020 | Lee | H01M 50/553 |
| 2021/0028423 A1 | 1/2021 | Shin et al. | |
| 2021/0296738 A1 | 9/2021 | Lee et al. | |
| 2021/0344074 A1 | 11/2021 | Jung et al. | |
| 2022/0045387 A1* | 2/2022 | Taniuchi | H01M 50/55 |
| 2022/0131229 A1 | 4/2022 | Chi et al. | |
| 2022/0173481 A1 | 6/2022 | Yoon et al. | |

FOREIGN PATENT DOCUMENTS

| | | | |
|---|---|---|---|
| JP | 2013229266 | 11/2013 | |
| JP | 2017-135846 A | 8/2017 | |
| JP | 2018538664 | 12/2018 | |
| KR | 10-2012-0050799 A | 5/2012 | |
| KR | 10-2016-0087082 A | 7/2016 | |
| KR | 10-2017-0095052 A | 8/2017 | |
| KR | 10-2018-0020547 A | 2/2018 | |
| KR | 10-2019-0026237 A | 3/2019 | |
| KR | 10-2034208 B1 | 10/2019 | |
| KR | 10-2020-0067587 A | 6/2020 | |
| KR | 10-2020-0104143 A | 9/2020 | |
| KR | 10-2020-0109727 A | 9/2020 | |
| KR | 20200113849 | 10/2020 | |
| KR | 10-2021-0002919 A | 1/2021 | |
| WO | 2020175881 | 9/2020 | |
| WO | WO-2021107395 A1 * | 6/2021 | H01M 10/613 |

* cited by examiner

[FIG. 1]

Related Art

[FIG. 2]

Related Art

[FIG. 3]

Related Art

BATTERY MODULE AND BATTERY PACK INCLUDING THE SAME

CROSS-REFERENCE TO RELATED APPLICATIONS

This application is a US national phase of international application No. PCT/KR2022/002361 filed on Feb. 17, 2022, and claims the benefit of Korean Patent Application No. 10-2021-0026972 filed on Feb. 26, 2021, the contents of which are incorporated herein by reference in their entirety.

TECHNICAL FIELD

The present disclosure relates to a battery module and a battery pack including the same, and more particularly, to a battery module having a novel cooling structure and a battery pack including the same.

BACKGROUND

Along with the developments in technology and increasing demand for mobile devices, demand for secondary batteries as energy sources has been increasing rapidly. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas medium- or large-sized devices such as vehicles require high power and large capacity. Therefore, a medium- or large-sized battery module having a plurality of battery cells electrically connected to one another is used.

Since the medium- or large-sized battery module is preferably manufactured to have as small a size and weight as possible, a prismatic battery, a pouch-shaped battery or the like, which can be stacked with high integration and has a small weight relative to capacity, is mainly used as a battery cell of the medium- or large-sized battery module. Such a battery module has a structure in which a plurality of cell assemblies including a plurality of unit battery cells are connected in series to obtain high output. Each of the battery cells includes positive electrode and negative electrode current collectors, a separator, an active material, an electrolyte solution, and the like, and thus can be repeatedly charged and discharged by an electrochemical reaction between components.

Meanwhile, recently, along with a continuous rise in the necessity for a large-capacity secondary battery structure, including the utilization of the secondary battery as an energy storage source, there is a growing demand for a battery pack having a multi-module structure which is an assembly of battery modules in which a plurality of secondary batteries are connected in series or in parallel.

Meanwhile, when a plurality of battery cells are connected in series or in parallel to configure a battery pack, a common method of manufacturing the battery pack includes first configuring a battery module composed of at least one battery cell and then adding other components to the at least one battery module.

Figure 1:
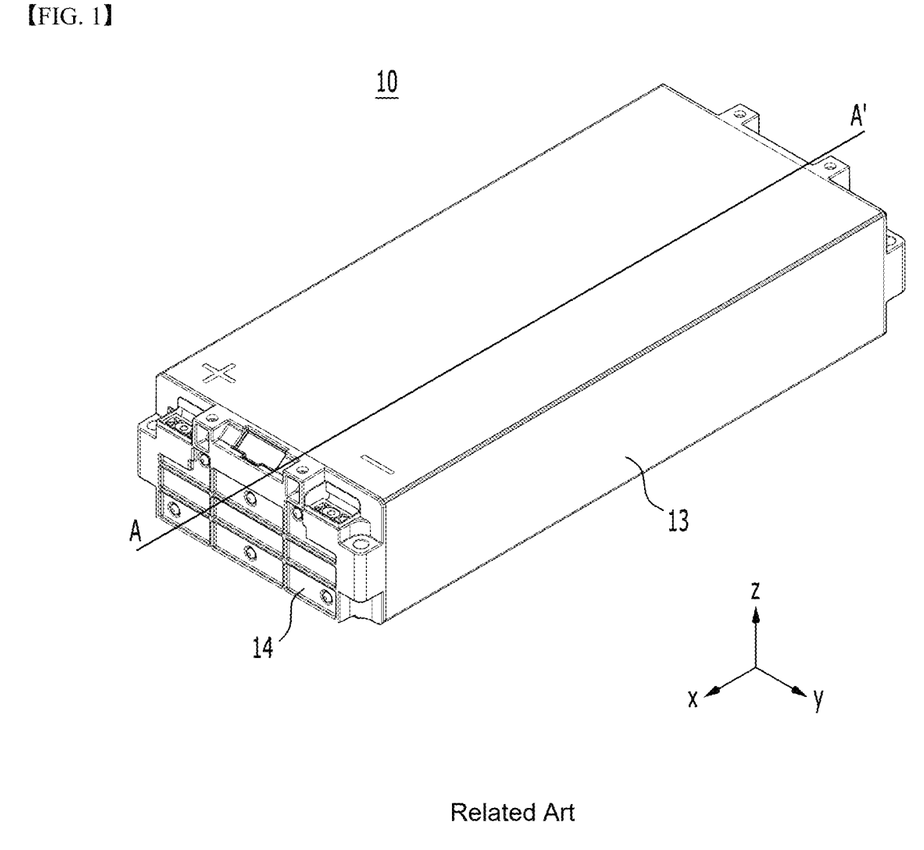
FIG. 1 is a perspective view of a conventional battery module.
Figure 2:
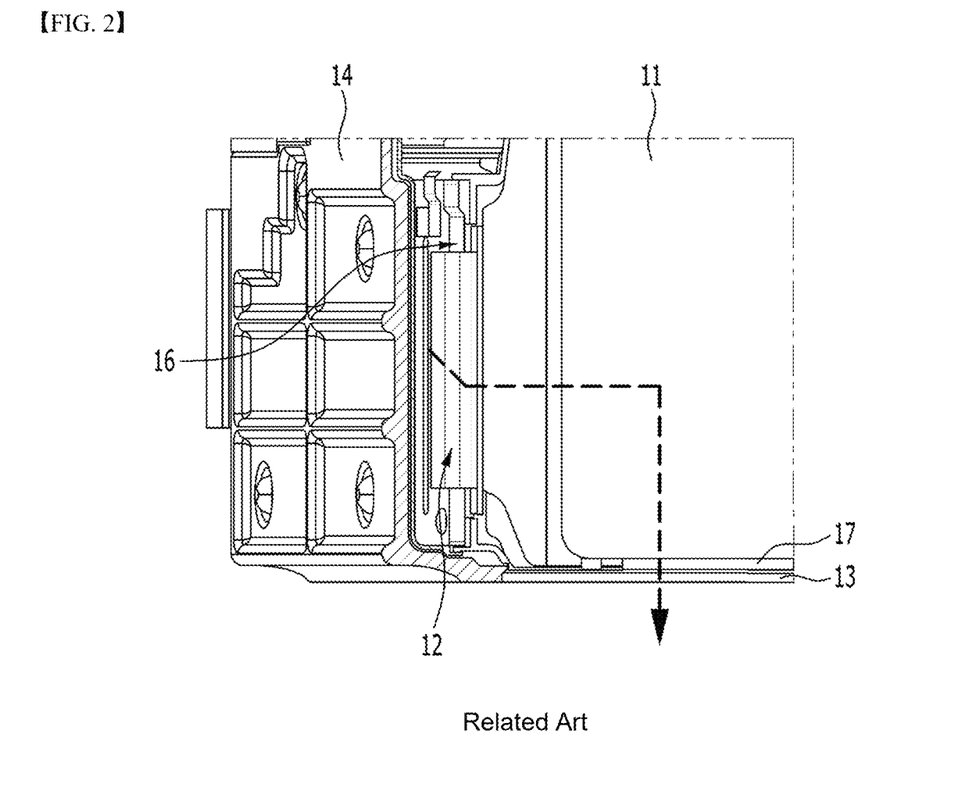
FIG. 2 is an enlarged cross-sectional view along the xz plane at the line A-A' of FIG. 1.
Figure 3:
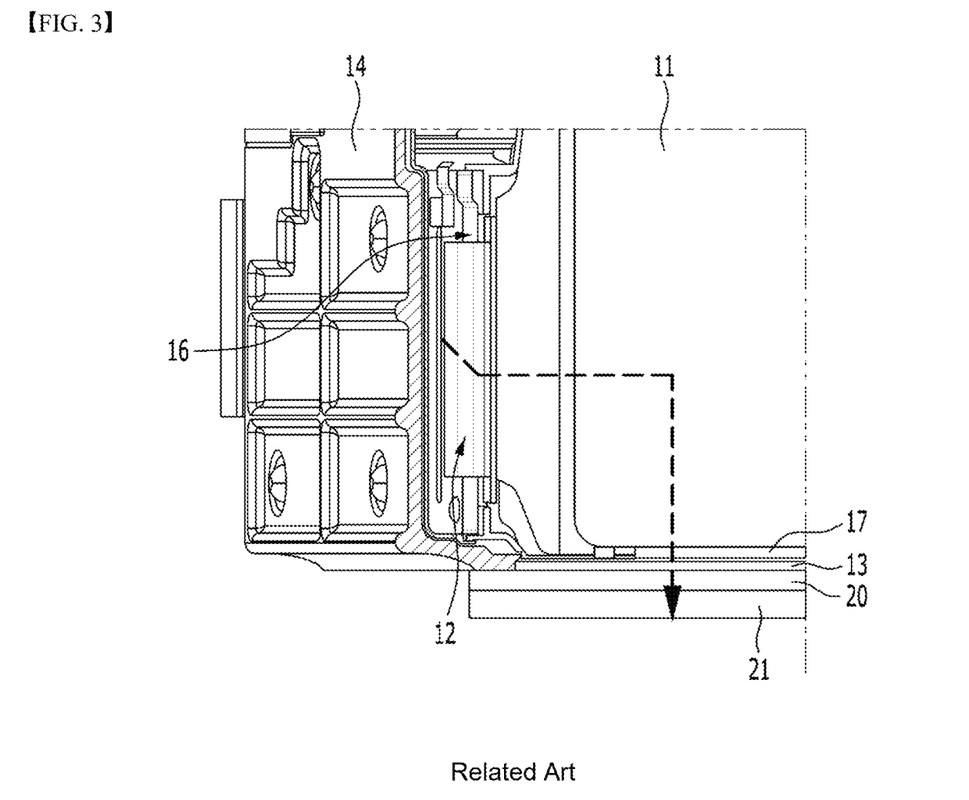
FIG. 3 is a cross-sectional view of a portion of the battery pack including a conventional battery module.

FIG. 1 shows a perspective view of a conventional battery module. FIG. 2 is an enlarged cross-sectional view along the xz plane with reference to the line A-A' of FIG. 1. FIG. 3 is a cross-sectional view of a portion of a battery pack including a conventional battery module.

As illustrated in FIGS. 1 and 2, the conventional battery module 10 includes a battery cell assembly consisting of a plurality of battery cells 11 stacked on each other, and a busbar assembly that electrically connects the electrode leads 12 of the plurality of battery cells 11 to each other, a housing 13 that covers the battery cell assembly, and a pair of end plates 14 that cover the busbar assembly.

The busbar assembly includes a pair of busbar frames, each having lead slots that allow the discrete passage of the electrode leads 12 of each battery cell 11, and further includes a pair of busbars 16 mounted on respective busbar frames having busbar slots to correspond to the number of lead slots that allow the busbars 16 to be connected to the electrode leads passing through the busbar slots by welding, etc.

The heat generated by a busbar 16 may be transmitted via the electrode lead 12, and then transferred via the battery cell 11, a thermal conductive resin layer 17 formed on the bottom part of the housing 13, and the bottom part of the housing 13 because there is no direct cooling path.

In addition, as illustrated in FIG. 3, the transferred heat may be further transferred via the heat transfer member 20 and the cooling plate 21 formed inside the battery pack that includes the conventional battery module 10.

Recently, there is a tendency to continuously increase the capacity, energy, fast charging rate, etc. and also increase the amount of current flowing through the busbar. The high current flowing through the busbar generates heat in the busbar, and such heat generation is difficult to effectively cool through the conventional cooling structure alone. Therefore, there is a need for a structure that can make direct contact with the busbar to cool the busbar to cool the heat generated in the busbar.

SUMMARY

It is an objective of the present disclosure to provide a battery module that can solve the heat generation problem of the busbar and a battery pack including the same.

However, the objectives of the present disclosure are not limited to the aforementioned objectives, and other objectives which are not described herein should be clearly understood by those skilled in the art from the following detailed description and the accompanying drawings.

According to one aspect of the present disclosure, there is provided a battery module comprising: a battery cell stack in which a plurality of battery cells are stacked, a housing that covers the battery cell stack, a busbar frame that covers a portion of the battery cell stack not covered by the housing, a pair of busbars that are connected to an electrode lead protruding from the battery cell stack via a slot formed in the respective busbar frame, a pair of end plates, each of which cover the respective busbar frame, and a heat transfer member that is connected to the respective busbar, wherein the heat transfer member is in contact with the respective end plate.

The busbar may be connected with the heat transfer member by bringing them into surface contact.

The heat transfer member may be formed of a material having electrical insulating property and thermal conductivity.

The battery module may further include an insulating cover located between the respective end plate and busbar frame, wherein the insulating cover has a lid part that covers the heat transfer member except for a part of the heat transfer member that is in contact with the respective end plate and busbar.

The heat transfer member may be located adjoining the lower end part of the end plate.

A plurality of heat transfer members may be included to be arranged apart from each other along the direction in which the plurality of battery cells are stacked.

The heat transfer member may include a curved structure, and at least one surface may come into contact with the respective busbar via the curved structure.

The heat transfer member may include a protruding bottom part that supports the lower end part of the respective busbar, and the protruding bottom part and the busbar may be in contact with each other.

Each of the end plates may be in contact with the housing, and the heat generated from the respective busbar may be sequentially transferred to the heat transfer member, the end plate, and the bottom part of the housing.

According to another aspect of the present disclosure, there is provided a battery pack comprising: the above-mentioned battery module, a second thermal conductive resin layer located under the bottom part of the battery module, and a cooling plate located under the second thermal conductive resin layer.

According to embodiments of the present disclosure, the problem of heat generated by the busbar in a high current and fast charging environment can be solved by a novel type of busbar cooling structure. Additionally, the stability of the battery module can be improved by solving the heat generation problem.

The effects of the present disclosure are not limited to the effects mentioned above and additional other effects not described above will be clearly understood from the description of the appended claims by those skilled in the art.

DETAILED DESCRIPTION

Hereinafter, various embodiments of the present disclosure will be described in detail with reference to the accompanying drawings so that those skilled in the art can easily carry out the invention described herein. The present disclosure can be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" or "comprising" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

The terms "first," "second," etc. are used to explain various components, but the components should not be limited by the terms. These terms are only used to distinguish one component from the other component.

Now, a battery module according to an embodiment of the present disclosure will be described with reference to FIGS. 4 to 11.

Figure 4:
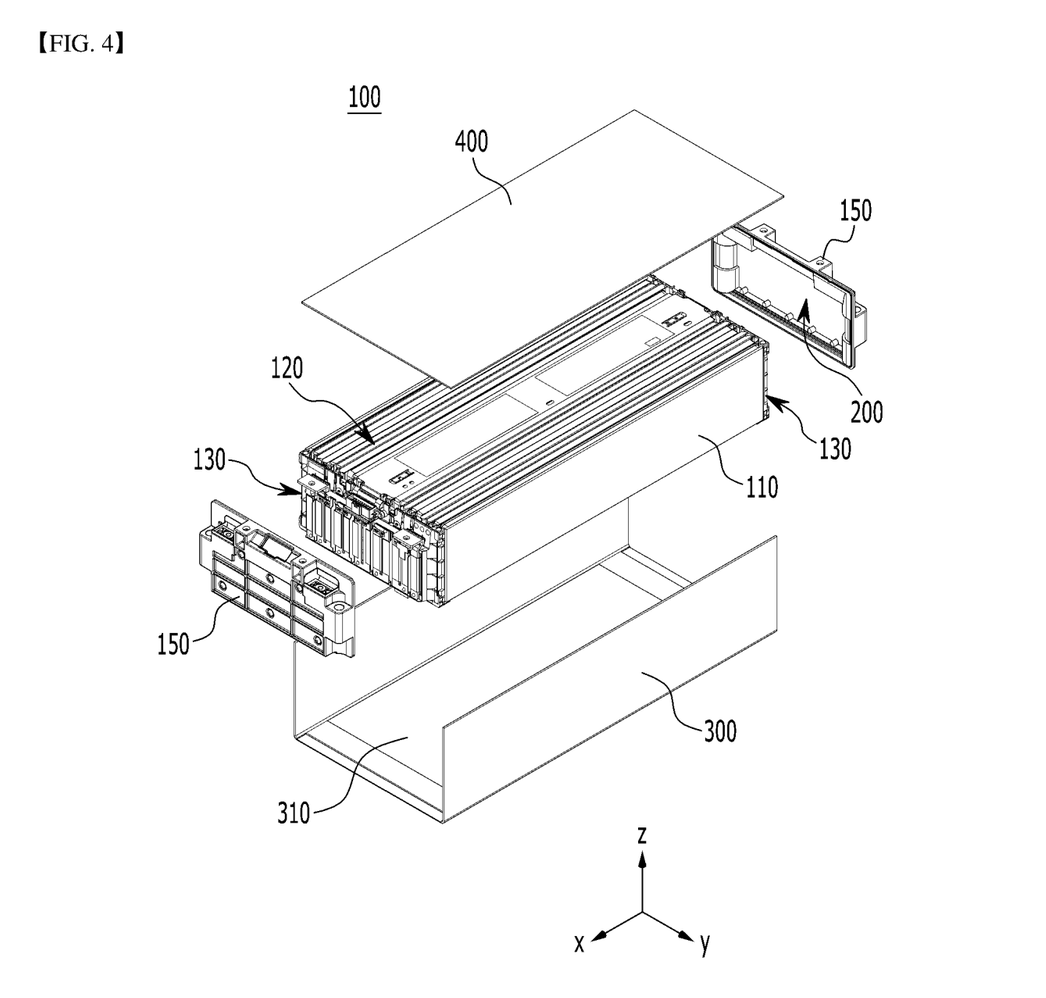
FIG. 4 is an exploded perspective view of a battery module according to an embodiment of the present disclosure.
Figure 5:
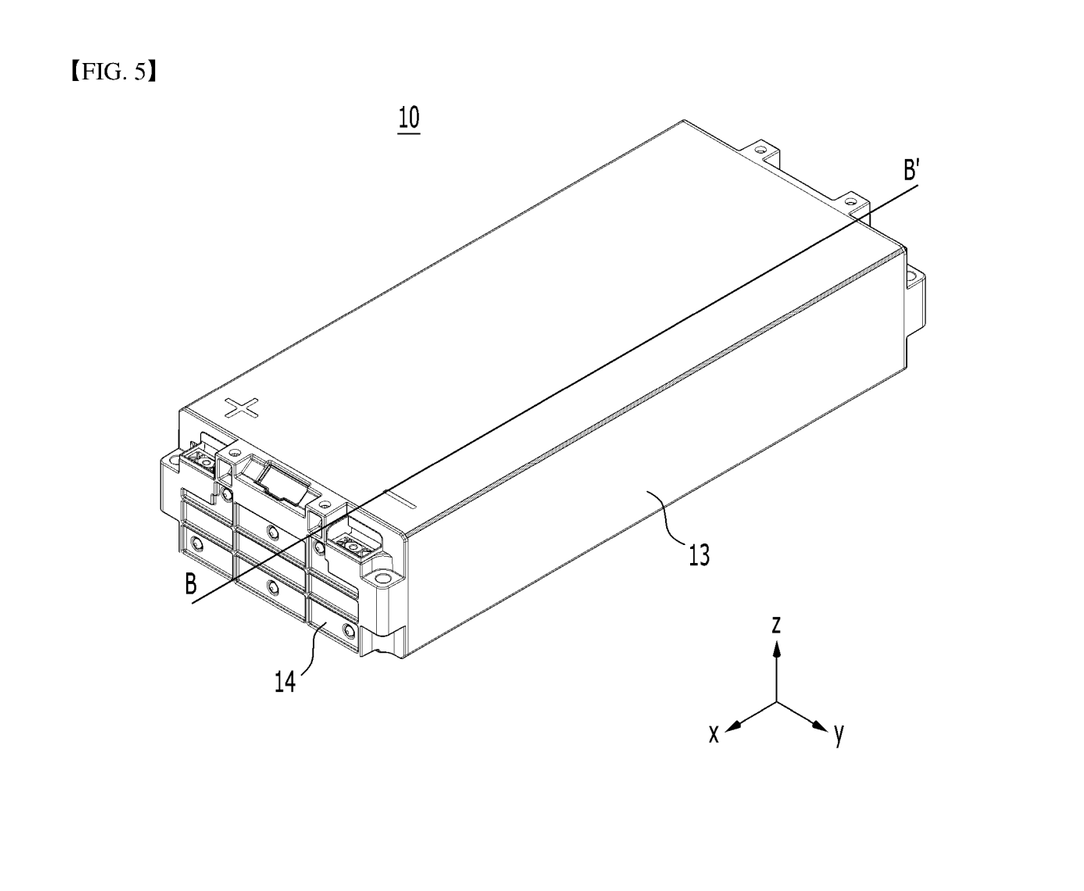
FIG. 5 is a perspective view of the battery module of FIG. 4 when the components of the battery module are combined.
Figure 6:
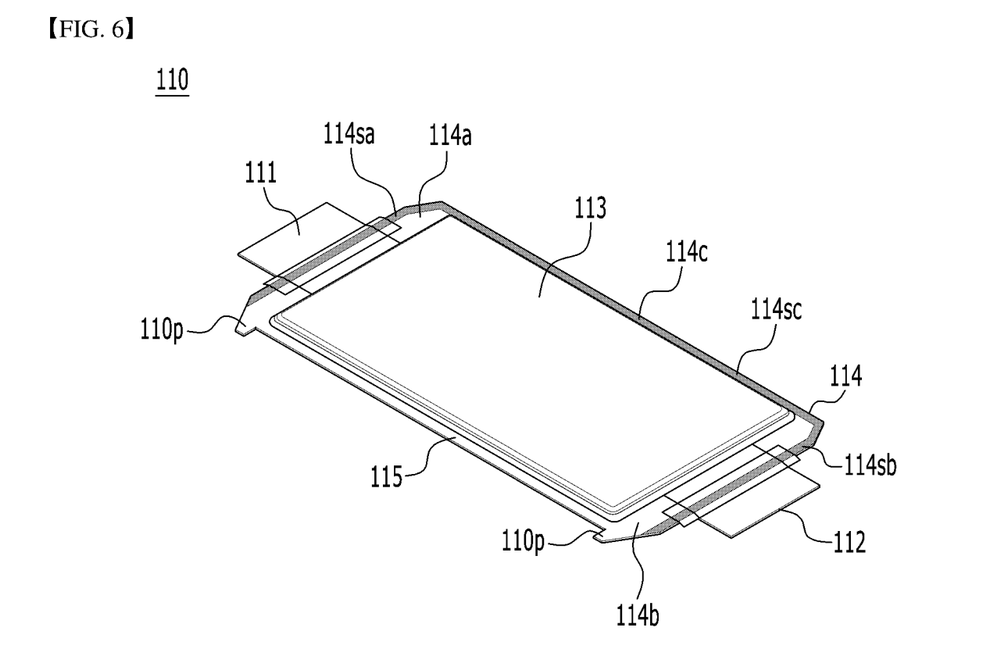
FIG. 6 is a perspective view of one battery cell included in the battery cell stack of FIG. 4.

FIG. 4 is an exploded perspective view of a battery module according to an embodiment of the present disclosure. FIG. 5 is a perspective view of the battery module of FIG. 4 when all the components are combined. FIG. 6 is a perspective view of one battery cell included in the battery cell stack of FIG. 4.

As illustrated in FIGS. 4 and 5, the battery module 100 according to an embodiment of the present disclosure may include a battery cell stack 120 in which a plurality of battery cells 110 are stacked, a housing for the battery cell stack 120, an upper plate 400 that covers the upper surface of the battery cell stack 120, a pair of end plates 150 that are respectively located on the front and rear surfaces of the battery cell stack 120, and a pair of busbar frames 130, each of which is located between the battery cell stack 120 and the respective end plate 150. The busbar frames 130 may cover a portion of the battery cell stack 120 exposed from the housing. The housing may include a U-shaped frame 300 of which an upper surface, a front surface and a rear surface are open. Further, the battery module 100 includes a thermal conductive resin layer 310 located between the U-shaped frame 300 and the battery cell stack 120. The thermal conductive resin layer 310 is a heat dissipation layer, and may be formed by applying a material having a heat dissipation function. The end plates 150 may be formed of a metal material.

When two open sides of the U-shaped frame 300 are referred to as a first side and a second side, respectively, the U-shaped frame 300 has a plate-shaped structure that is bent to continuously warp the front, lower and rear surfaces adjacent to each other among the remaining outer surfaces excluding surfaces of the battery cell stack 120 corresponding to the first side and the second side. The upper surface corresponding to the lower surface of the U-shaped frame 300 is open.

The upper plate 400 has a single plate-shaped structure that covers the remaining upper surface excluding the front, lower and rear surfaces which are wrapped by the U-shaped frame 300. The U-shaped frame 300 and the upper plate 400 can be coupled by welding or the like in a state in which the corresponding edge areas are in contact with each other, thereby forming a structure wrapping the battery cell stack 120.

The battery cell stack 120 includes a plurality of battery cells 110 stacked in one direction, and the plurality of battery cells 110 may be stacked in the y-axis direction as shown in FIG. 4. In other words, a direction in which the plurality of battery cells 110 are stacked may be the same as a direction in which two side surface parts of the U-shaped frame 300 face each other.

The battery cell 110 is preferably a pouch type battery cell. For example, as illustrated in FIG. 6, the battery cell 110 according to the present embodiment may have a structure in which the two electrode leads 111 and 112 protrude from one end part 114a and the other end part 114b of the battery main body 113, respectively, toward mutually opposite directions. The battery cell 110 can be manufactured by joining both end parts 114a and 114b of the cell case 114 and both side surfaces 114c connecting them in a state in which an electrode assembly (not shown) is housed in the cell case 114. In other words, the battery cell 110 according to the present embodiment has a total of three sealing parts 114sa, 114sb and 114sc, wherein the sealing parts 114sa, 114sb and 114sc have a structure that is sealed by a method such as heat fusion, and the remaining other side part may be formed of a connection part 115. Between both end parts 114a and 114b of the cell case 114 is defined as a longitudinal direction of the battery cell 110, and between the one side surface 114c and the connection part 115 that connect both end parts 114a and 114b of the cell case 114 is defined as a width direction of the battery cell 110.

The connection part 115 is a region that extends along one edge of the battery cell 110, and a protrusion part 110p of the battery cell 110 may be formed at an end part of the connection part 115. The protrusion part 110p may be formed on at least one of both end parts of the connection part 115 and may protrude in a direction perpendicular to the direction in which the connection part 115 extends. The protrusion part 110p may be located between one of the sealing parts 114sa and 114sb of both end parts 114a and 114b of the cell case 114, and the connection part 115.

The cell case 114 is generally formed of a laminated structure of a resin layer/metallic thin film layer/resin layer. For example, a surface of the cell case formed of an O (oriented)-nylon layer tends to slide easily by an external impact when a plurality of battery cells are stacked in order to form a medium- or large-sized battery module. Therefore, an adhesive member, for example, a sticky adhesive such as a double-sided tape or a chemical adhesive coupled by a chemical reaction upon adhesion, can be attached to the surface of the cell case to form the battery cell stack 120 to prevent the battery cell stack from sliding and maintain a stable stacked structure of the battery cells. In the present embodiment, the battery cell stack 120 may be stacked in a y-axis direction and housed in the U-shaped frame 300 in a z-axis direction. A comparative example includes battery cells formed as cartridge-shaped components and the battery cells are fixed to each other and assembled in the housing. In this comparative example, there is almost no cooling action or the cooling may be proceeded in a surface direction of the battery cells because of the presence of the cartridge-shaped components, whereby the cooling does not well perform toward a height direction of the battery module.

As illustrated in FIG. 4, the U-shaped frame 300 according to the present embodiment includes a bottom part and two side parts facing each other connected by the bottom part. Before the battery cell stack 120 is mounted on the bottom part of the U-shaped frame 300, a thermal conductive resin is applied to the bottom part of the U-shaped frame 300, and the thermal conductive resin can be cured to form a thermal conductive resin layer 310. The thermal conductive resin layer 310 is located between the bottom part of the U-shaped frame 300 and the battery cell stack, and can serve to transfer heat generated in the battery cells 110 to the bottom of the battery module 100 and fix the battery cell stack 120.

Figure 7:
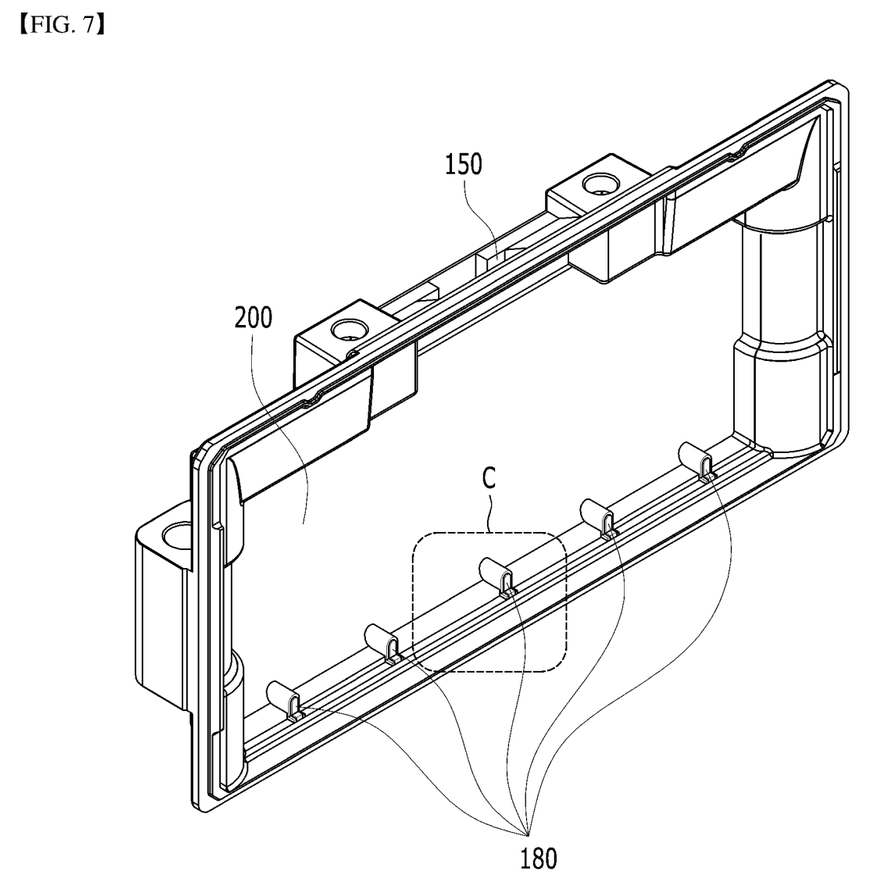
FIG. 7 is a perspective view of an end plate included in the battery module of FIG. 4.
Figure 8:
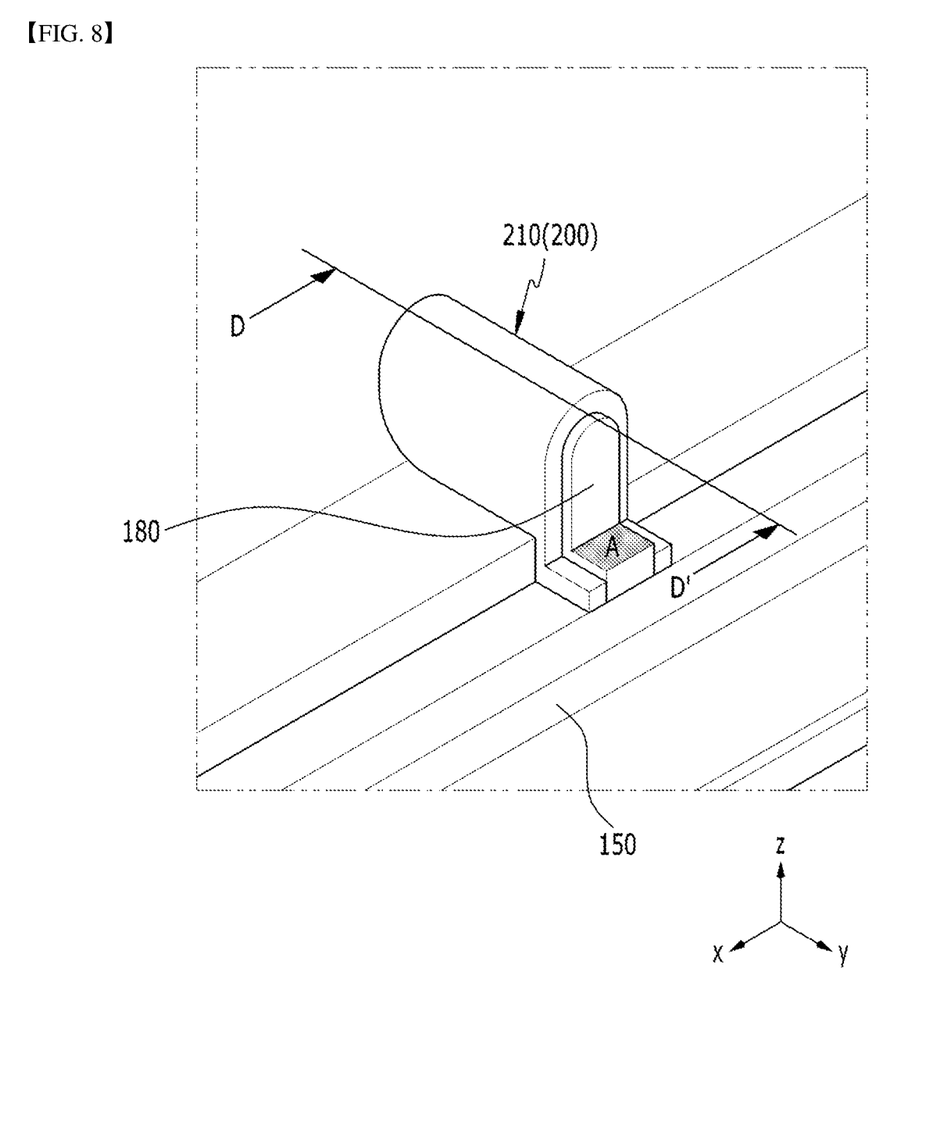
FIG. 8 is an enlarged view of section C of FIG. 7.
Figure 9:
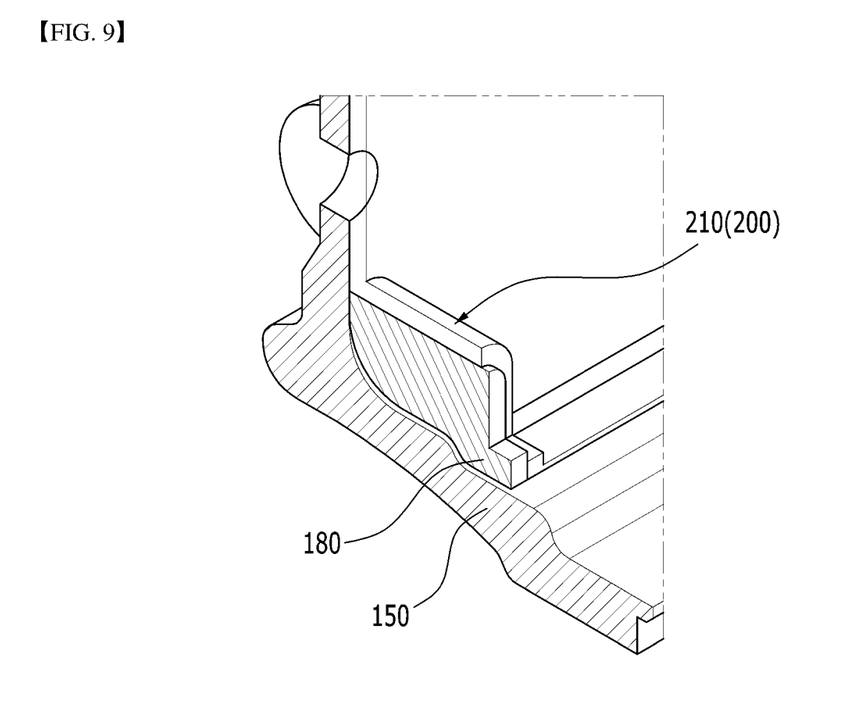
FIG. 9 is an enlarged cross-sectional view along the yz plane at the line D-D' of FIG. 8.
Figure 10:
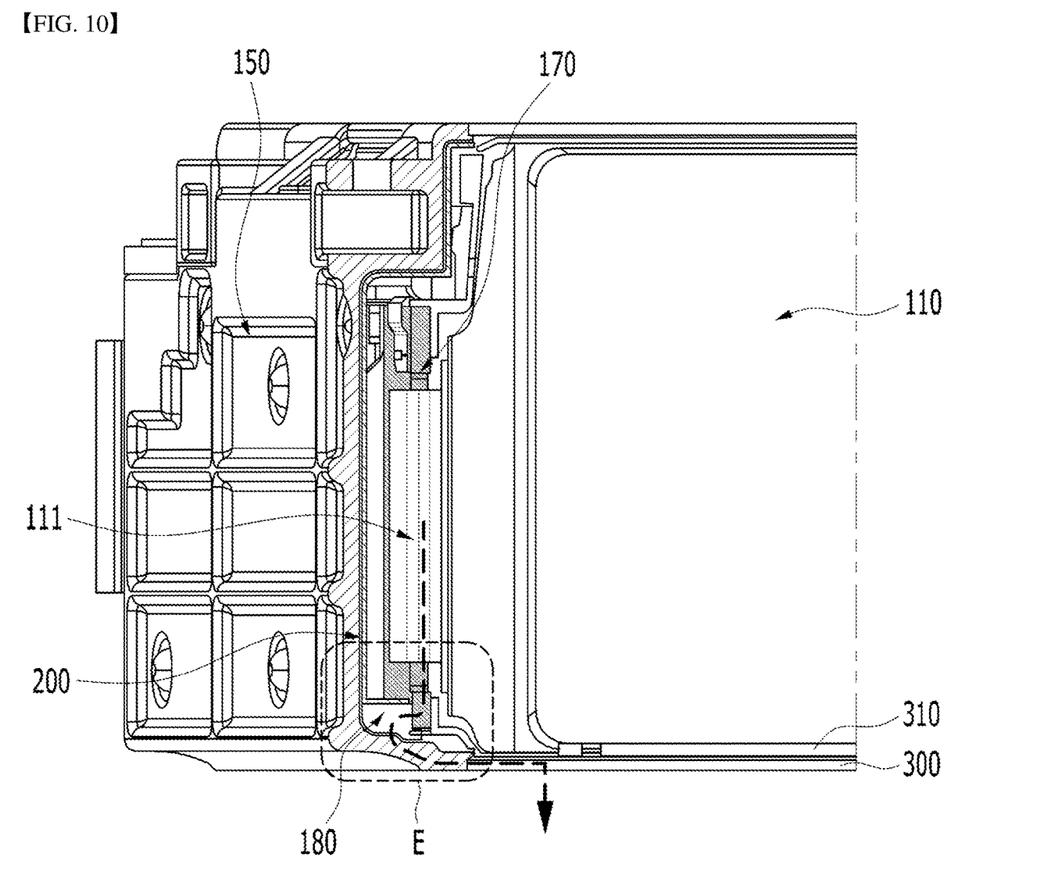
FIG. 10 is an enlarged cross-sectional view along the xz plane at the line B-B' of FIG. 5.
Figure 11:
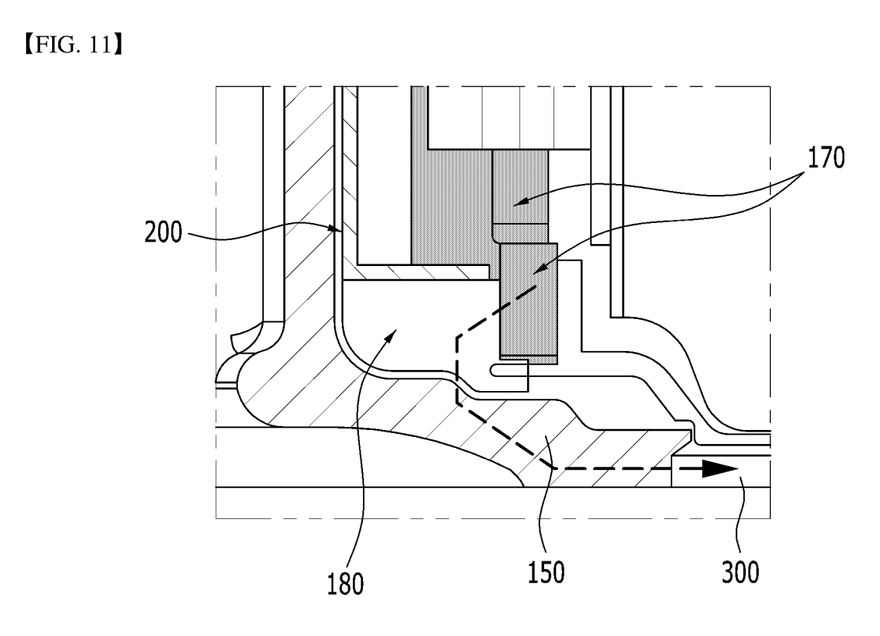
FIG. 11 is an enlarged view of section E of FIG. 10.

FIG. 7 is a perspective view of an end plate included in the battery module of FIG. 4. FIG. 8 is an enlarged view of section C of FIG. 7. FIG. 9 is an enlarged cross-sectional view along line D-D' in the yz plane of FIG. 8. FIG. 10 is an enlarged cross-sectional view along line B-B' in the xz plane of FIG. 5. FIG. 11 is an enlarged view of section E of FIG. 10.

The conventional battery module does not have a direct cooling path for the busbar, and thus, heat generated by the busbar is discharged only by a path connecting the busbar, electrode leads, battery cells, thermal conductive resin layer and a bottom part of the housing. However, in a situation where high heat is generated by the busbar in a short time by the flow of high current, similarly to rapid charging, a cooling structure capable of minimizing the temperature rise of the busbar is needed.

Therefore, as illustrated in FIGS. 7 to 9, the battery module 100 according to the present embodiment includes a busbar 170 connected to the electrode lead 111 protruding from the battery cell stack 120 via the slot formed in the busbar frame 130, and a heat transfer member 180 connected to the busbar 170. At this time, the heat transfer member 180 comes into contact with the end plate 150.

The busbar 170 according to the present embodiment may be in surface contact with the heat transfer member 180 which connects the busbar 170 to the heat transfer member 180. The heat transfer member 180 includes a curved structure and at least one surface may come into contact with the busbars 170 via the curved structure. Particularly, as illustrated in FIG. 8, the heat transfer member 180 includes a protruding bottom part A that supports the lower end part of the busbars 170, and the protruding bottom part A and the respective busbar 170 may come into contact with each other. The curved structure may be formed to have the same shape as that of the respective busbar 170 so that the busbar 170 can be fitted into the structure, but is not limited thereto. Rather, a portion of the heat transfer member 180 can be configured without contacting the busbars 170 so as not to apply mechanical stress to the busbars 170. Therefore, the heat generated in the busbar 170 may be transferred to the heat transfer member 180 through the contact between the busbar 170 and the heat transfer member 180, and cooling of the busbars 170 can be performed.

The heat transfer member 180 according to the present embodiment may be formed of a material having electrical insulation properties and thermal conductivity. Specifically, the heat transfer member 180 may include one of a heat transfer pad and a thermal conductive resin layer. Additionally, the heat transfer member 180 may be formed through a method in which a liquid is initially injected and then cured. The heat transfer member 180 has electric insulating property, but has thermal conductivity, thereby enabling heat conduction while maintaining the insulating property of the busbars 170.

The heat generated from the busbars 170 may be sequentially transferred to the heat transfer member 180, the respective end plate 150, the bottom part of the housing, particularly the U-shaped frame 300, and then discharged. Through the structure of being sequentially transferred and discharged as described above, heat in the busbar generated in a high current situation such as rapid charging can be effectively discharged, and the stability of the battery module can be secured.

In particular, as illustrated in FIG. 7, the heat transfer member 180 of the present disclosure may be located adjoining the lower end part of the end plates 150. Specifically, the heat transfer member 180 may be located closer to the lower end part than the upper end part of each of the end plates 150.

Further, a battery module may include a plurality of heat transfer members 180 to be arranged apart from each other along the direction in which the plurality of battery cells 110 are stacked. Specifically, as illustrated in FIG. 4, the plurality of battery cells 110 may be stacked in the y-axis direction, and the plurality of heat transfer members 180 may be arranged apart from each other along the y-axis direction on the end plate 150.

The heat transfer member 180 comes into contact with the end plate 150, thereby enabling rapid cooling. Further, the heat transfer member 180 of the present disclosure adjoins the lower end part of the end plate 150, whereby it is possible to prevent the cooling performance of the heat transfer member 180 from being weakened due to the phase change of the heat transfer member 180 when the temperature of the busbar 170 is high.

The heat transfer member 180 may be formed based on the number of busbars 170 in contact with the heat transfer member 180, but is not limited thereto. The number of busbars 170 can be formed to maximize the cooling. Further, in some cases, a plurality of heat transfer members 180 may be formed to cover the entire lower end part of the end plate 150, or may be integrally formed to cover the entire the lower end part of the end plate 150. Thereby, the efficiency of rapid cooling can be further increased when the heat transfer members 180 come into contact with the end plate 180.

The battery module according to an embodiment of the present disclosure may further include an insulating cover 200 located between the end plate 150 and the busbar frame 130. The insulating cover 200 includes a lid part 210 that covers the heat transfer member 180 except for a portion of the heat transfer member 180 that comes into contact with the end plate 150 and the busbar 170. The shape of the insulating cover 200 may correspond to the shape of the heat transfer member 180, and may serve to maintain the shape of the heat transfer member 180 so that the heat transfer member 180 is not detached or broken after assembling the module. In addition, the insulating property of the heat transfer member 180 can be secured through the lid part 210.

As illustrated in FIGS. 10 and 11, the end plate 150 of the battery module according to an embodiment of the present disclosure may come into contact with the housing. In particular, the end plate 150 can come into contact with the bottom part of the U-shaped frame 300 of the housing. Therefore, the heat generated in the busbar 170 can be transferred to the heat transfer member 180, the end plate 150, and the bottom part of the housing, particularly the U-shaped frame 300, and discharged.

Further, under the bottom part of the housing included in the battery module according to the present embodiment, particularly, the U-shaped frame 300, the second thermal conductive resin layer 320 and the cooling plate 700 may be formed as a pack component, or the cooling plate 700 may be formed integrally with the battery module may be formed. Therefore, the heat transferred to the bottom part of the U-shaped frame 300 can be transferred to the second thermal conductive resin layer 320 and the cooling plate 700, and discharged, whereby the heat generated in the busbar 170 can be effectively cooled and discharged through the above transfer, and the stability of the battery module can be secured.

Next, a battery pack according to another embodiment of the present disclosure will be described with reference to FIG. 12.

Figure 12:
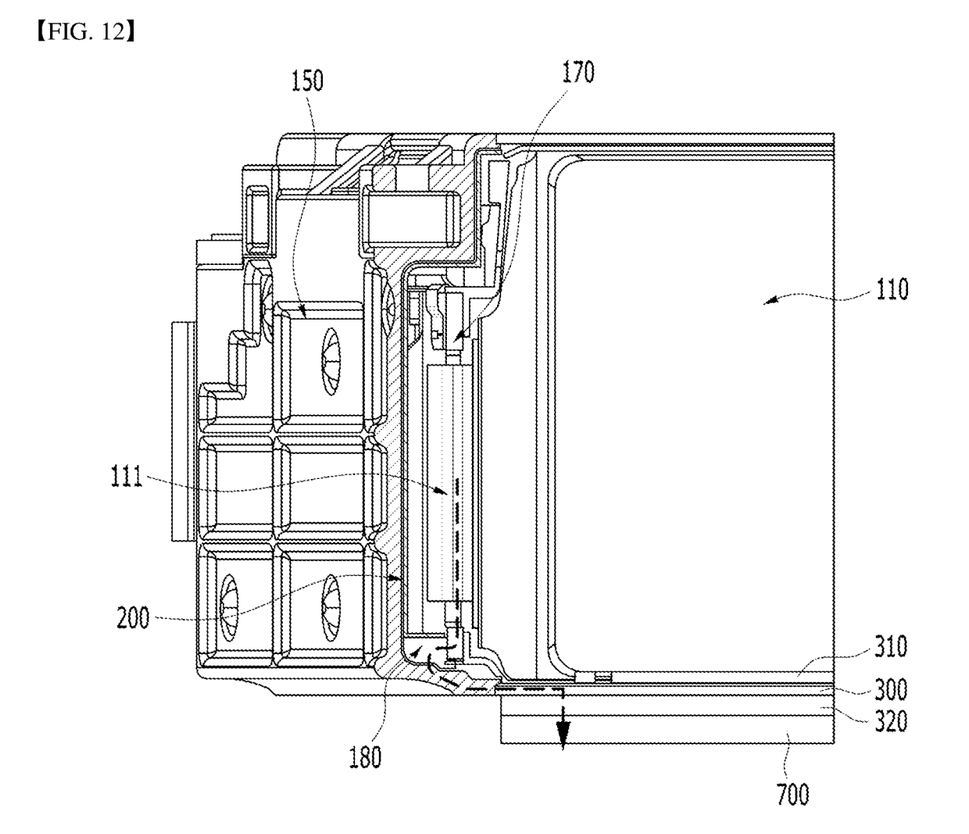
FIG. 12 is a cross-sectional view of a battery pack according to another embodiment of the present disclosure.

FIG. 12 is a cross-sectional view of a battery pack according to another embodiment of the present disclosure.

As illustrated in FIG. 12, the battery pack according to the present embodiment includes a second thermal conductive resin layer 320 located under the bottom part of the battery module, the U-shaped frame 300 described above, and a cooling plate 700 located under the second thermal conductive resin layer 320.

Therefore, as previously described, the heat transferred to the busbar 170, the heat transfer member 180, the end plate 150, and the bottom part of the U-shaped frame 300 can be further transferred to the second thermal conductive resin layer 320 and the cooling plate 700. The heat generated in the busbar 170 is cooled through this path, thereby enabling effective cooling.

In addition, the battery pack of the present disclosure may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also falls under the scope of the present disclosure.

Although the preferred embodiments of the invention has been shown and described above, the scope of the present disclosure is not limited thereto, and numerous other modifications and changes can be made by those skilled in the art, without departing from the spirit and scope of the principles of the invention described in the appended claims. Further, these modified embodiments should not be understood individually from the technical spirit or perspective of the present disclosure.

The invention claimed is:

1. A battery module comprising:
a battery cell stack comprising a plurality of battery cells,
a housing for the battery cell stack,
a pair of busbar frames that cover a portion of the battery cell stack not covered by the housing, a pair of busbars, each of which is connected to an electrode lead protruding from the battery cell stack via a slot formed in the respective busbar frame,
a pair of end plates that cover the pair of busbar frames, respectively, and
at least one heat transfer member connected to one of the pair of busbars,
wherein the at least one heat transfer member is in contact with the respective end plate, and
wherein the at least one heat transfer member is in direct contact with the one of the pair of busbars.

2. The battery module of claim 1, wherein:
the one of the pair of busbars is in surface contact with the at least one heat transfer member.

3. The battery module of claim 2, wherein:
the at least one heat transfer member comprises a material having electrical insulating property and thermal conductivity.

4. The battery module of claim 3, further comprising:
an insulating cover located between the each of the pair of end plates and the respective busbar frame,
wherein the insulating cover has a lid part that covers the at least one heat transfer member except for a portion of the heat transfer member in contact with the respective end plate and the respective busbar.

5. The battery module of claim 4, wherein:
the at least one heat transfer member adjoins a lower end part of the respective end plate.

6. The battery module of claim 5, wherein:
the battery module comprises a plurality of the at least one heat transfer members, which are arranged apart from each other along a direction in which the plurality of battery cells are stacked.

7. The battery module of claim 6, wherein:
each of the plurality of heat transfer members comprises a curved structure, and
at least one surface of the heat transfer member is in contact with the respective busbar via the curved structure.

8. The battery module of claim 7, wherein:
each of the heat transfer members comprises a protruding bottom part that supports a lower end part of the respective busbar, and
the protruding bottom part is in contact with the lower end part of the respective busbar.

9. The battery module of claim 1, wherein:
the pair of end plates are in contact with the housing, and
the heat generated from each of the pair of busbars is sequentially transferred to a respective one of the at least one heat transfer member, the respective end plate, and the respective bottom part of the housing.

10. A battery pack comprising:
the battery module of claim 1,
a second thermal conductive resin layer located under a bottom part of the battery module, and
a cooling plate located under the second thermal conductive resin layer.

* * * * *